April 3, 1956 A. H. SWAN, JR 2,740,427
ARTICULATED HOSE
Filed Aug. 9, 1952

INVENTOR.
ALFRED H. SWAN JR.
BY Lyon & Lyon
ATTORNEYS

United States Patent Office 2,740,427
Patented Apr. 3, 1956

2,740,427

ARTICULATED HOSE

Alfred H. Swan, Jr., South Pasadena, Calif.

Application August 9, 1952, Serial No. 303,499

19 Claims. (Cl. 138—56)

My invention relates to articulated hose, and included in the objects of my invention are:

First, to provide an articulated hose formed of a strip of plastic or fabric material helically wound to produce a series of laminations or plies, each anchored internally to a compression coil and externally to a tension coil.

Second, to provide an articulated hose which is particularly inexpensive of manufacture and may be made in any length;

Third, to provide an articulated hose which is fluid tight and may be designed to withstand substantial internal or external pressures;

Fourth, to provide an articulated hose which requires a minimum of metal, the metal being in the form of a compression-resisting coil, and which may be entirely covered by the fabric or plastic material which comprises the major component of the hose;

Fifth, to provide an articulated hose wherein the tension coil wrapped about the exterior of the hose may be formed of a tubular member capable of compression so that the exterior of the hose has a cushion surface to protect surfaces over which it may be drawn as well as to reduce wear on the hose itself and to increase the flexure which the hose may withstand.

With the above and other objects in view as may appear hereinafter, reference is directed to the accompanying drawings, in which.

Figure 1:
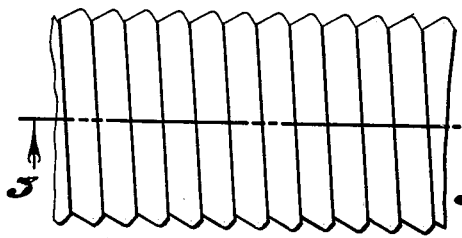
Figure 1 is a fragmentary elevational view of one form of my articulated hose.
Figure 3:
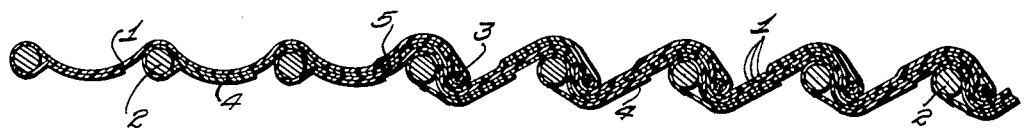
Figure 3 is an enlarged fragmentary longitudinal sectional view taken through 3—3 of Figure 1.

Reference is first directed to the construction shown in Figures 1 and 3. In this construction my articulated hose comprises a laminated strip or web 1, a compression member 2 and tension member 3. The compression member is formed of relatively stiff wire and is coiled helically. The web 1 is wrapped helically about the compression member or coil 2 so as to overlap two or more convolutions of the coil. The web 1 is wrapped at the same pitch as the compression coil so that the convolutions of the web overlap each other to form a multiple-ply or laminated tube. The web is clamped between the compression coil and the succeeding wrapping of the web adjacent its inner margin, designated 4. The inner margin forms a flap of any desired width and may be folded and cemented to the web so as to completely enclose the compression coil.

As the web 1 is wound, a cord or string, constituting the tension member 3, or other flexible member capable of resisting tension, is wound so as to overlie the web adjacent its outer margin. This margin, designated 5, is folded around and tucked under the tension member 3. The tension member as it is wound is forced between the convolutions of the compression coil 2, corrugating the web 1. The tension member having a smaller internal diameter than the compression member or coil so as to interlock therewith, thereby to prevent axial stripping of the web from the finished tube. Moreover, the crests of the corrugations overlie the convolutions of the compression coil 2 and the troughs of the corrugations are disposed between the convolutions of said coil and have an inside diameter that is smaller than the inside diameter of said compression coil. This construction also serves to lock the compression coil in place.

As a result, the convolutions of the compression member 1 are subject to radial compression, and the wire comprising the compression member is placed under circumferential compression due to the force exerted by the web and tension member. Conversely, the convolutions of the tension member are subject to radial tension or expansion, and the cord or the like comprising the tension member is placed under circumferential tension. Thus, the member 1 is referred to as a "compression" member because it resists radial compression; whereas, the member 3 is referred to as a "tension" member because it resists radial expansion. The tension member is placed under tension not only by the expansion force exerted by the compression member but also by the pressure of fluids carried within the tubing. Conversely, the compression member withstands any crushing load due to a lower pressure within the tubing than exists externally of the tube.

The web 1 may be formed of a strip of plastic material, or may be formed of fabric. The thickness of the web depends upon the use for which the resulting hose is intended. As flexibility is often an important factor, the web may be quite thin; for example, but not by way of limitation, a thickness of .004" has been found satisfactory for the construction of a vacuum cleaner hose. If the web is of sufficient width to embrace four convolutions of the compression coil, the average wall thickness of the resulting tube would be .016".

The surface of the web may be coated with an adhesive as it is wrapped or with a plasticizer or merely heat sealed, depending on the nature of the material comprising the web, so that the convolutions of the web bond to each other. However, it has been found that a fluid-tight hose may be constructed capable of withstanding substantial tensional loads without bonding the convolutions of the web or, for that matter, sealing the inner margin 4 of the web.

It should be noted that the inner margin 4 of the web need not form a loose flap, but may terminate closely adjacent the compression coil and therefore offer no appreciable interference with fluid flow through the tubing. Furthermore, the margin 4 may be looped in the reverse direction so as to be retained between the plies of the web just as the outer margin 5 is tucked or inserted between the plies of the web.

It will be appreciated that by varying the gauge size of the wire comprising the compression coil and by varying the diameter of the tension member which forms the tension coil 3 and, further by varying the width and thickness of the web 1, the resulting hose may vary widely in the degree of flexibility and resistance to abrasion or to tensional loads.

Figure 2:
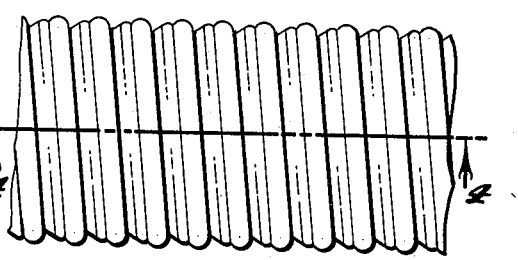
Figure 2 is a similar view showing a modified form of my articulated hose.
Figure 4:
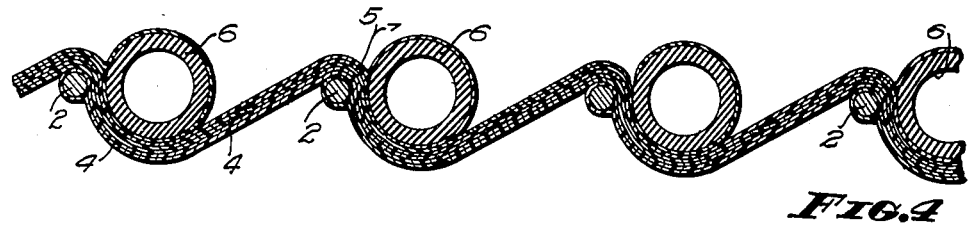
Figure 4 is a similar longitudinal sectional view taken through 4—4 of Figure 2.

Reference is directed to Figures 2 and 4. This construction differs from the first described construction by the substitution of a tube 6 for the cord which forms the tension coil 3. The tube 6 may be formed of plastic material, preferably selected so as to resist undue stretching. The outer margin 5 of the web is tucked around and under the tube 6 in the same manner as shown in Figure 3. The tube 6 is of such diameter that it projects above the surface of the portion of the web passing over the compression coil 2. The tube itself forms a cushion to minimize excessive wear on the resulting hose. The tube 6 is compressible so that in spite of its comparatively large size, the resulting hose may be quite flexible; that is, the tube 6 may compress axially with respect to the hose as it is squeezed between the convolutions of the compression coil when the hose is flexed. In the construction shown in Figure 4 the inner margin 4 of the web is of a length greater than the pitch of the compression coil so that its extremity may be caught under the succeeding convolution. With this arrangement no adhesive or plasticizer is needed in order to eliminate the inside loose flap. However, it should be recognized that an adhesive or plasticiser may be used or the material heat sealed together if the nature of the material permits, if desired.

Figure 5:
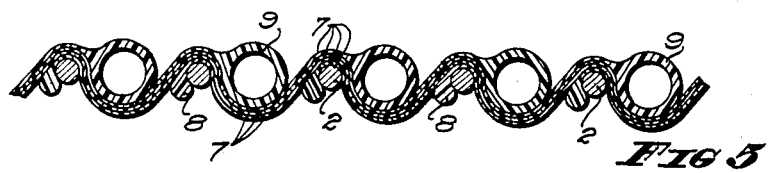
Figure 5 is a fragmentary longitudinal sectional view of a further modified form of my articulated hose.
Figure 6:
Figure 6 is a cross sectional view of the web member from which the hose shown in Figure 5 is fabricated.

Reference is now directed to Figures 5 and 6. In the construction herein shown, the web 7 may be an extruded plastic web having an integral rib 8 along one margin and an integral cushion or tension tube 9 along its other margin, or, if desired, a solid rib may be substituted for the tube 9. The web 7 is wrapped in the manner of the first described structures. The rib 8 follows the helical contour of the compression coil 2 and wedges between the coil and the succeeding convolution of the web to interlock and prevent axial slipping of the web. This arrangement eliminates a loose internal flap or the need of cementing this flap.

Figure 7:
Figure 7 is a fragmentary longitudinal sectional view of a further modified form of my articulated hose.
Figure 8:
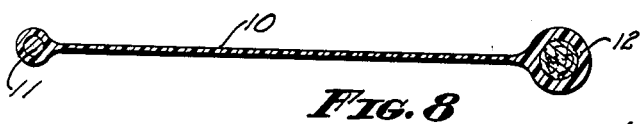
Figure 8 is a transverse sectional view of a web structure employed in the fabrication of the hose construction shown in Figure 7.

Reference is now directed to Figures 7 and 8. In this construction a single extrusion incorporates the web, compression member and tension member of the first described structure. The web, designated 10, is formed of plastic material and is provided along one margin with a compression member 11, formed of wire and completely covered by the plastic material comprising the web. The other margin of the web encases the tension member 12. It may be observed that the compression member and tension member may be fed through an extrusion die and emerge with the web thus forming a unitary structure. In forming the hose, the compression member 11 is passed through coiling rollers which cause it to assume a helical form corresponding to the compression coil 2. The opposite margin of the web carrying the tension member 12 is forced between the convolutions of the compression member 11 as shown in Figure 7.

Figure 9:
Figure 9 is a fragmentary sectional view showing a conductor incorporated in the tension member.

While my articulated hose is shown as a "single" pitch construction, it may have a multiple pitch construction. Inasmuch as the essential characteristic of the tension member is that it be relatively resistant to stretching, and be flexible, it follows that this member may be a multiple strand conductor wire. Thus, should it be desirable to provide electrical communication between the ends of my articulated hose, the hose may be wound single, double or triple pitch so as to carry the requisite number of conductors serving also as the tension members. In this regard reference is directed to Figure 9 wherein a conductor 13 is shown molded in one margin of the web 10.

Having fully described my invention, it is to be understood that I do not wish to be limited to the details herein set forth, but my invention is of the full scope of the appended claims.

I claim:

1. An articulated hose, comprising: a web of flexible material helically wrapped upon itself to produce a plurality of plies, and providing an interior margin and an exterior margin; a compression coil at said interior margin; and a tension coil at said exterior margin disposed between the convolutions of said compression coil.

2. An articulated hose, comprising: a web of flexible material helically wrapped upon itself to produce a plurality of plies and provided with an interior folded margin and an exterior folded margin; a compression coil within said interior folded margin; and a tension coil within said exterior folded margin.

3. An articulated hose as set forth in claim 2 wherein: at least one of said margins forms a closed loop completely covering a corresponding coil.

4. An articulated hose as set forth in claim 2 wherein: the plies of said web are adhered together and the margins thereof form closed loops completely covering said coils.

5. An articulated hose, comprising: a web of imperforate flexible material wound helically upon itself to form a multi-ply tube, the inner margin of the web being disposed within the tube, the outer margin being exposed externally of the tube; a helical compression coil at the inner margin of the web; and a helical tension coil extending along the outer margin of said web and disposed between the convolutions of the compression coil to form corrugations in said web, the inside diameter of said tension coil being less than the outside diameter of said compression coil.

6. An articulated hose, comprising: a helical compression coil of wire; a web of imperforate flexible material wrapped helically around said compression coil, said web overlying several convolutions of the coil and wrapped upon itself to form a multi-ply tube; and a tension coil wrapped helically about said web and interposed between the convolutions of the compression coil to corrugate said web.

7. An articulated hose as set forth in claim 6 wherein: one margin of said web envelopes said compression coil and its other margin envelopes said tension coil.

8. An articulated hose as set forth in claim 6 wherein: the plies of said web are adhered together and said margins are wrapped about said compression coil and tension coil respectively.

9. An articulated hose as set forth in claim 2 wherein: said tension coil is formed of a tube having yieldable walls to provide an exterior cushion surface.

10. An articulated hose as set forth in claim 6 wherein: said tension coil is formed of a tube having yieldable walls to provide an exterior cushion surface.

11. An articulated hose, comprising: a helical compression coil; a web of extruded plastic material; a tension element molded in one margin of said web; said web being wrapped helically about said compression coil to form a multi-ply tube with said tension element at the outer surface of said tube and interposed between the convolutions of the compression coil to form corrugations in said tube, the inner margin of said web being disposed between convolutions of said compression coil and the succeeding wrappings of said web.

12. An articulated hose as set forth in claim 11 wherein: the inner margin of said web is provided with a rib interlocking with said compression coil.

13. An articulated hose as set forth in claim 11 wherein: the compression coil is enveloped by the inner margin of said web.

14. An articulated hose as set forth in claim 11 wherein: the compression coil is molded within the margin of said web opposite from said tension member.

15. An articulated hose, comprising: a web extrusion; a wire molded in one margin of said web; a flexible tension member molded in the opposite margin of said web; said web being coiled helically upon itself to form a multiply tube with said wire being formed into a helical compression coil within said tube and said tension member formed into a tension coil outside said tube and pressed between the convolutions of said compression coil.

16. A flexible hose, comprising: a helical wire coil; and a web of flexible material having a pitch equal to said coil and wrapped about said coil with one margin at least partially enveloping said coil; said web having a width several times its pitch so as to cover several convolutions of said coil and form a plurality of laminations; said web being depressed radially between the convolutions of said coil.

17. A flexible hose, comprising: a helical wire coil; a web of flexible material having a pitch equal to said coil and wrapped about said coil with one margin at least partially enveloping said coil; said web having a width several times its pitch so as to cover several convolutions of said coil and form a plurality of laminations; and a second coil disposed adjacent the other margin of said web and forced between the convolutions of said wire coil to corrugate said web.

18. An articulated hose, comprising: a helical compression coil of wire; a strip of imperforate flexible material wrapped helically around said compression coil with consecutive convolutions disposed in partially overlapping relation to each other to form a multi-ply tube, said strip having a width sufficient to overlie more than one convolution of said compression coil; and a helical tension coil underlying at least one ply of said tube and interposed between the convolutions of said compression coil.

19. An articulated hose, comprising: a helical compression coil of wire; a strip of imperforate flexible material wrapped helically around said compression coil with consecutive convolutions disposed in partially overlapping relation to each other to form a multi-ply tube, said strip having a width sufficient to overlie more than one convolution of said compression coil, said strip also having helical corrugations with the crests of the corrugations overlying the convolutions of said compression coil and with the troughs of the corrugations disposed between the convolutions of said compression coil, said troughs having an inside diameter smaller than the inside diameter of said compression coil; and a helical tension member disposed in the troughs of the corrugations and underlying at least one ply of the tube.

References Cited in the file of this patent

UNITED STATES PATENTS

| | | |
|---|---|---|
| 1,974,285 | Maclachlan | Sept. 18, 1934 |
| 2,321,064 | Broedling | June 8, 1943 |
| 2,340,794 | Chernack | Feb. 1, 1944 |
| 2,486,387 | Bringolf | Nov. 1, 1949 |
| 2,597,806 | Martin | May 20, 1952 |
| 2,609,002 | Meissner | Sept. 2, 1952 |

FOREIGN PATENTS

| | | |
|---|---|---|
| 591,307 | Great Britain | Aug. 13, 1947 |